Patented Jan. 25, 1949

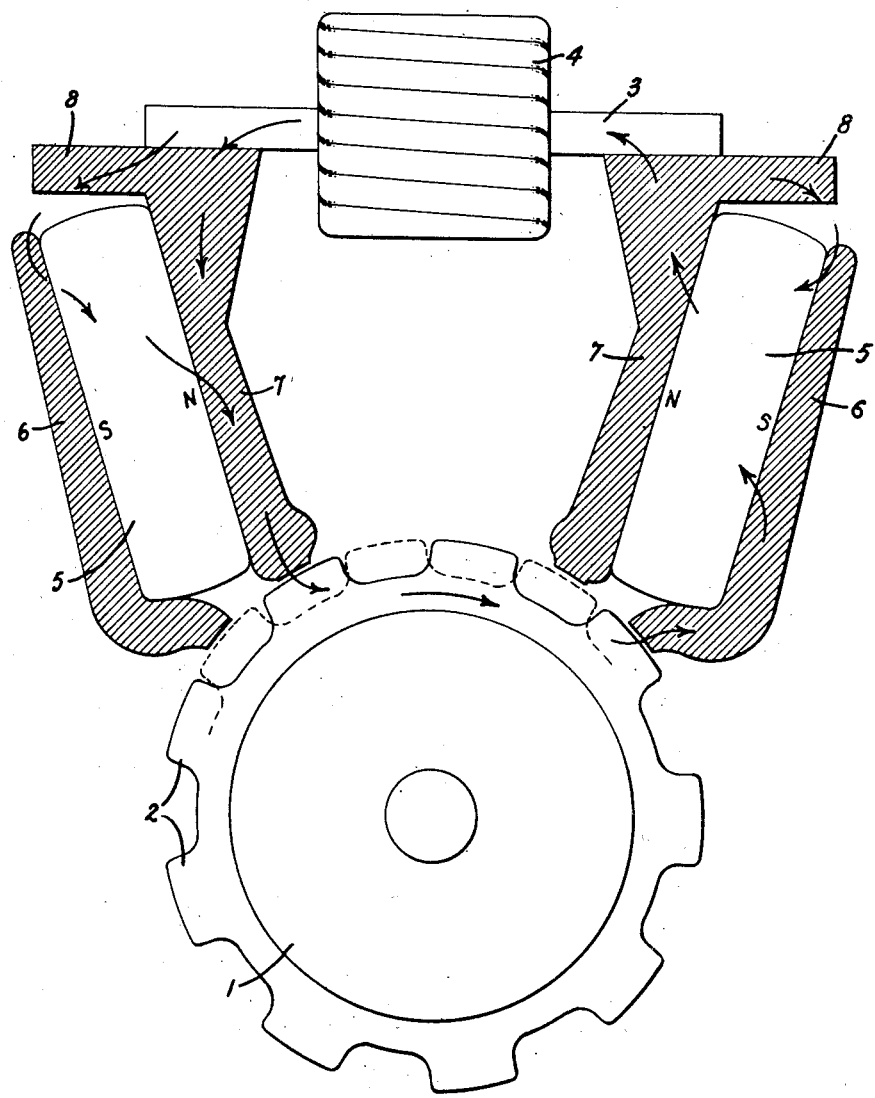

2,460,130

UNITED STATES PATENT OFFICE 2,460,130

MAGNETO

Ingolf B. Johnson, Schenectady, N. Y., assignor to General Electric Company, a corporation of New York Application June 9, 1945, Serial No. 598,509

10 Claims. (Cl. 171—209)

My invention relates to magnetos of the inductor type.

An object of my invention is to provide an improved magneto construction utilizing permanent magnets as a source of excitation thereof.

Further objects and advantages of my invention will become apparent and my invention will be better understood from the following description referring to the accompanying drawing, and the features of novelty which characterize my invention will be pointed out with particularity in the claims annexed to and forming part of this specification.

The drawing is a schematic representation of a magneto provided with an embodiment of my improved construction.

Referring to the drawing, I have shown an embodiment of my invention as applied to a dynamo-electric machine adapted to be used as a magneto having a rotatable inductor member 1 provided with a plurality of circumferentially spaced apart teeth 2 and a stationary member including a core formed of magnetic material having a part formed as a winding core member 3 which magnetically couples or threads a coil member 4. A plurality of permanent magnets 5, preferably of high coercive force are adapted to provide the excitation for the machine. Each of these permanent magnets is provided with laminated pole piece core portions formed as a pair of members 6 and 7 of magnetic material connected to the pole faces of the permanent magnets and extending towards the rotatable member teeth 2. The polar projecting portions of these pole piece core members are circumferentially spaced apart adjacent the rotatable member teeth 2 substantially an odd number of half-tooth pitches of the rotatable member tooth pitch. In the construction shown in the drawing, these polar projections are a half-tooth pitch apart for each permanent magnet, as this has been found to provide a partial keeper for the permanent magnets, and the pole piece core polar projections of like polarity are circumferentially spaced apart adjacent the rotatable member teeth substantially an odd number of half tooth pitches of the rotatable member tooth pitch. The permanent magnets are formed with the poles of like polarity connected to the coil core portions 3 through the upper ends of the pole piece core portions 7, such that the magnetic flux through the winding 4 alternates in direction as the rotatable member 1 rotates from a position, as shown in solid lines in the figure, to another position, shown in dotted lines in the figure, in which the magnetic flux also reverses through the rotatable inductor member 1.

In making the field structure of these magnetos, it has been found desirable to assemble the permanent magnet 5 and its laminated cores 6 and 7 prior to the magnetizing of the permanent magnet. I have found that the initially stored and the available magnetic energy of a magnet may be materially increased and maintained, other conditions being the same, if the permanent magnet is partially keepered by decreasing the air gap between its poles by a suitable partial keeper or shunt of magnetic material secured to the magnet prior to its magnetization for use with the magnet in the magneto. This feature is provided in part by the arrangement of the polar projections of the cores 6 and 7 a half-tooth pitch apart and principally by the provision of a keeper portion projection 8 on one of the pole piece core portions. In the illustrated construction this keeper projection 8 is formed on the pole piece core portion 7 adjacent the coil core portion 3 which extends between the pole faces of each permanent magnet 5 and partially closes the air gap between the pole faces of opposite polarity of each of the permanent magnets. The air gap between the keeper projection 8 and the adjacent end of the pole piece core portion 6 is greater than the air gap between the polar projections 6 and 7 and the rotatable member teeth 2, such that the magnetic flux will normally tend to go through the permanent magnet 5 which is actively in the circuit, as indicated by the arrows in the drawing, and no large portion of this permanent magnet flux will be shunted through the keeper when the permanent magnet 5 is actively in the circuit with the coil core portion 3. However, this keeper portion 8 will assist in reducing the reluctance of the magnetic circuit, and part of the flux will pass through the keeper portion 8, the pole piece core portion 6, the permanent magnet 5, and then return to the pole piece core portion member 7, as shown in the left-hand side of the drawing, when the other permanent magnet 5 is actively in the magnetic circuit of the machine, as shown in solid lines in the illustrated position of the rotatable member teeth 2. In this manner, both of the permanent magnets 5 will always be in a magnetic circuit, and the higher available energies, provided by the partially keepered permanent magnets will be effective in producing a higher magnetic flux through the coil core 3.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A magneto including a rotatable inductor member having a plurality of circumferentially spaced apart teeth, a coil member, a core member threading said coil member, a plurality of permanent magnets, each of said permanent magnets, having pole piece core members of magnetic material connected to each pole face thereof with portions extending toward said rotatable member teeth, said permanent magnet being connected to said coil core through said pole piece core members, and a keeper portion on said pole piece core members partially closing the air gap between pole faces of opposite polarity of each of said permanent magnets.

2. A magneto including a rotatable inductor member having a plurality of circumferentially spaced apart teeth, a coil member, a core member threading said coil member, a plurality of permanent magnets, each of said permanent magnets having pole piece core members of magnetic material connected to each pole face thereof with portions extending toward said rotatable member teeth, said permanent magnets having their pole faces of like polarity connected to said coil core through said pole piece core members, and a keeper portion on said pole piece core members partially closing the air gap between pole faces of opposite polarity of each of said permanent magnets providing an air gap greater than the air gap between said rotatable member teeth and said pole piece core members.

3. A magneto including a rotatable inductor member having a plurality of circumferentially spaced apart teeth, a coil member, a core member threading said coil member, a pair of permanent magnets having high coercive force, each of said permanent magnets having laminated pole piece core members of magnetic material connected to each pole face thereof with portions extending toward said rotatable member teeth and circumferentially spaced apart substantially an odd number of half-tooth pitches of said rotatable member tooth pitch, said permanent magnet being connected to said coil core through said pole piece core members, and a keeper portion on said pole piece core members partially closing the air gap between pole faces of opposite polarity of each of said permanent magnets.

4. A magneto including a rotatable inductor member of magnetic material having a plurality of circumferentially spaced apart teeth, a coil member, a core member threading said coil member, a pair of permanent magnets having high coercive force for said coil member, each of said permanent magnets having laminated pole piece core members of magnetic material connected to each pole face thereof with portions extending toward said rotatable member teeth, said permanent magnets being connected to said coil core through said pole piece core members and being arranged with pole piece core member projections of like polarity circumferentially spaced apart adjacent said rotatable member teeth substantially an odd number of half-tooth pitches of said rotatable member tooth pitch, and a keeper portion on said pole piece core members partially closing the air gap between pole faces of opposite polarity of each of said permanent magnets.

5. A magneto including a rotatable inductor member having a plurality of circumferentially spaced apart teeth, a coil member, a plurality of permanent magnets, a core of magnetic material having a part coupled with said coil and pole piece core member portions connected to each pole face of said permanent magnets with portions extending toward said rotatable member teeth, said permanent magnets having their pole faces of like polarity connected to said coil core through said pole piece core portions and being arranged with pole piece core projections of like polarity circumferentially spaced apart adjacent said rotatable member teeth substantially an odd number of half-tooth pitches of said rotatable member tooth pitch, and a keeper portion on said pole piece core portions partially closing the air gap between pole faces of opposite polarity of each of said permanent magnets.

6. A magneto including a rotatable inductor member having a plurality of circumferentially spaced apart teeth, a coil member, a plurality of permanent magnets having high coercive force, a core of magnetic material having a part coupled with said coil and pole piece core member portions connected to each pole face of said permanent magnets with portions extending toward said rotatable member teeth and circumferentially spaced apart substantially an odd number of half-tooth pitches of said rotatable member tooth pitch, said permanent magnets having their pole faces of like polarity connected to said coil core through said pole piece core portions and being arranged with pole piece core projections of like polarity circumferentially spaced apart adjacent said rotatable member teeth substantially an odd number of half-tooth pitches of said rotatable member tooth pitch, and a keeper portion on said pole piece core portions partially closing the air gap between pole faces of opposite polarity of each of said permanent magnets.

7. A magneto including a rotatable inductor member having a plurality of circumferentially spaced apart teeth, a coil member, a core member threading said coil member, a plurality of permanent magnets, each of said permanent magnets having pole piece core members of magnetic material connected to each pole face thereof with portions extending toward said rotatable member teeth and circumferentially spaced apart substantially an odd number of half-tooth pitches of said rotatable member tooth pitch, said permanent magnets having their pole faces of like polarity connected to said coil core through said pole piece core members and being arranged with pole piece core member projections of like polarity circumferentially spaced apart adjacent said rotatable member teeth substantially on odd number of half-tooth pitches of said rotatable member tooth pitch, and a keeper portion on said pole piece core members partially closing the air gap between pole faces of opposite polarity of each of said permanent magnets providing an air gap greater than the air gap between said rotatable member teeth and said pole piece core members.

8. A magneto including a rotatable inductor member having a plurality of circumferentially spaced apart teeth, a coil member, a core member threading said coil member, a plurality of permanent magnets having high coercive force, each of said permanent magnets having laminated pole piece core members of magnetic material connected to each pole face thereof with portions extending toward said rotatable member teeth circumferentially spaced apart substantially an odd number of half-tooth pitches of said rotatable member tooth pitch, said permanent magnets having their pole faces of like polarity connected to said coil core through said pole piece core members and being arranged with pole piece core member projections of like polarity circumferentially spaced apart adjacent said rotatable member teeth substantially an odd number of half-tooth pitches of said rotatable member tooth pitch, and a keeper projecting portion on said pole piece core members adjacent said coil core partially closing the air gap between pole faces of opposite polarity of each of said permanent magnets.

9. A stationary member for dynamoelectric machines including a winding core, a winding on said core, a pair of permanent magnets, each of said permanent magnets having pole piece core members of magnetic material connected to each pole face thereof, said permanent magnets being connected to said winding core through said pole piece core members, and a keeper portion on said pole piece core members partially closing the air gap between pole faces of opposite polarity of each of said permanent magnets.

10. A stationary member for dynamoelectric machines including a winding core, a winding on said core, a pair of permanent magnets of high coercive force, each of said permanent magnets having laminated pole piece core members of magnetic material connected to each pole face thereof, said permanent magnets having pole faces of like polarity connected to said winding core through said pole piece core members, and a keeper portion on said pole piece core members adjacent said winding core partially closing the air gap between pole faces of opposite polarity of each of said permanent magnets.

INGOLF B. JOHNSON.

REFERENCES CITED

The following references are of record in the file of this patent:

UNITED STATES PATENTS

| Number | Name | Date |
|---|---|---|
| 2,118,313 | Kongsted | May 24, 1938 |
| 2,150,688 | Louis | Mar. 14, 1939 |
| 2,255,477 | Tognola | Sept. 9, 1941 |
| 2,298,652 | Schwarzmann et al. | Oct. 13, 1942 |